Dec. 14, 1965   F. X. BUSCHMAN ET AL   3,223,564
MANUFACTURE OF POLYTETRAFLUOROETHYLENE INSULATED WIRES
Filed Jan. 22, 1962   2 Sheets-Sheet 1

INVENTORS
Francis X. Buschman
Charles J. Beran
BY
Adams, Forward and McLean
ATTORNEYS Dec. 14, 1965 F. X. BUSCHMAN ET AL 3,223,564
MANUFACTURE OF POLYTETRAFLUOROETHYLENE INSULATED WIRES
Filed Jan. 22, 1962 2 Sheets-Sheet 2

INVENTORS
Francis X. Buschman
Charles J. Beran
BY
Adams, Forward and McLean
ATTORNEYS

United States Patent Office 3,223,564
Patented Dec. 14, 1965

3,223,564
MANUFACTURE OF POLYTETRAFLUORO-
ETHYLENE INSULATED WIRES
Francis X. Buschman, Huntington, N.Y., and Charles J.
Beran, Riverside, Conn., assignors to Tensolite Insulated Wire Co., Inc., a corporation of Delaware
Filed Jan. 22, 1962, Ser. No. 168,586
3 Claims. (Cl. 156—53)

This application is a continuation-in-part of application Serial No. 761,816, filed September 18, 1958.

This invention relates to covered products and in particular provides a polytetrafluoroethylene covered product and a process for its production.

As is well known, polytetrafluoroethylene not only possesses exceptional electrical insulating properties, but is also resistant to high temperature, making it a highly desirable insulating material for electrical conductors. Heretofore, polytetrafluoroethylene has been applied as electrical insulation for conductors by several methods. One of these is extrusion. In extruding polytetrafluoroethylene, it is necessary to use "uncured" polytetrafluoroethylene in powdered form and blended with approximately 20% of a volatile oil to render it plastic and extrudable. Extrusion can be accomplished only in a discontinuous manner, using a ram or double-acting rams. Since polytetrafluoroethylene is not a thermo plastic in the accepted sense and is subject to particle shear when mechanically worked, it cannot readily be extruded in a continuous manner by a worm or the like. Consequently, the extruded covering, even after drying to remove the volatile oils and sintering to fuse the covering, provides a dielectrically discontinuous insulation for the conductor, a discontinuity being occasioned by the end of each stroke of the extrusion ram or rams. The extruded covering, moreover, tends to include dielectric "pin holes," because of the difficulty in removing air from the mixture being extruded, which further reduce the length of insulated wire which can be manufactured as a dielectrically continuous unit.

Polytetrafluoroethylene has also been applied as an insulated covering for electrical conductors by helically wrapping uncured polytetrafluoroethylene tape (manufactured by an extrusion process) into which a shrinkage factor has been incorporated, such that upon subsequent sintering the shrinkage of the helically wound tape supplies the necessary pressure to fuse adjacent overlapping layers of the tape and seal the insulated covering thus formed about the conductor. Considerably longer dielectrically continuous lengths of insulated wire can be manufactured by the helical winding method than can be manufactured by the extrusion method. It is however, not possible, either by the extrusion or helical winding methods, to manufacture insulating coverings for electrical conductors employing sintered, i.e., fully cured, polytetrafluoroethylene since the latter cannot be extruded and, although in tape form it can be helically wound about a conductor, it cannot be adequately sealed since the necessary pressure to produce sealing under heat cannot be provided.

It has been found that sintered (skived) polytetrafluoroethylene tape can be applied as an electrical insulating material for a conductor or the like employing the apparatus disclosed in United States Patent No. 2,335,191, which results in a product in which the tape lies parallel to the conductor and is spirally wrapped about the conductor in several layers, as seen in cross-section. In the apparatus of the above United States patent, the tape is helically applied about a solid or stranded conductor while rotating the conductor and tape winding on the surface of heated, rotating drum in a direction causing the tape to wrap about the conductor and at the same time drawing the conductor and helical wrapping at least partially around the drum with a lead angle relative to the direction of movement of the surface of the drum. The conductor is withdrawn from the drum with the helically wrapped tape covering and immediately given a reverse twist from that imparted by the rolling contact over the drum which causes the helically wrapped tape to realign itself in a spiral having its axis coincident with the axis of the conductor. Thus, a line drawn lengthwise of the tape will assume a position parallel to the conductor, and the operation can conveniently be described as "parallel wrapping." The pressure exerted by the drum on the wrapping as it is passed about the drum provides the necessary pressure for coalescence of the tape between adjacent layers of the tape, such that in most circumstances successive layers of the tape can be considered to be sealed together. The wrapping must be heated, by contact with the drum or otherwise, to at least the temperature required for fusion, which is usually 625°–675° F. Perfect fusion of the tape to a homogeneous mass is not accomplished, however, and voids will be found within the resultant parallel wrapped insulation particularly where more than one tape is simultaneously wrapped. Such voids result in a lowered corona extinction level since they provide air spaces in which ionization can occur.

It has now been found that if in the parallel wrapping operation the sintered polytetrafluoroethylene tape is provided at least on one side with a uniform coating of finely divided, uncured polytetrafluoroethylene particles and if the tape is then parallel wrapped on the conductor or other elongated body with the coated side facing the conductor, the resultant product possesses dielectric properties vastly superior to those of polytetrafluoroethylene conductors manufactured by any other method, particularly with regard to dielectric strength and continuity and corona extinction level. As in the case of parallel wrapping of plain sintered tape described above, however, the apparatus typified by United States Patent No. 2,335,191 or its equivalent must be employed in order to provide adequate pressure to seal adjacent layers of the wrapping. In addition to possessing superior dielectric properties, the polytetrafluoroethylene insulated conductor of this invention also possesses the advantage that the tendency of the insulation to withdraw from a cut end at elevated temperatures over a period of time is greatly reduced.

The coating of uncured polytetrafluoroethylene particles can also include a pigment or the like to facilitate color coding of the resultant insulated wire or other conductor. The inclusion of such pigment in the coating on the tape, since the color is concentrated in a relatively small space within the resultant insulation, does not reduce the dielectric strength of the insulation as in the case of pigments incorporated in the polytetrafluoroethylene tape in a helical winding or incorporated in the molding composition in an extrusion coating operation.

In general, according to this invention the polytetrafluoroethylene coating is applied to the sintered tape prior to the parallel wrapping operation as a composition containing finely divided, dispersed particles of uncured polytetrafluoroethylene. The most desirable thickness for such coating is less than 0.001 inch, but to produce a uniform coating at such thickness the only practical way is to utilize a coating composition which contains finely divided particles of uncured polytetrafluoroethylene dispersed in water, deposit this coating on the surface of the tape and then dry. Since polytetrafluoroethylene is extremely difficult to wet, the coating composition must include wetting agents (which may be in part supplied as the normal dispersants in the commercially available polytetrafluoroethylene dispersions). In addition the coating composition must be modified in viscosity such that the viscosity will be sufficiently high during drying to maintain a uniform thickness and avoid puddling as the aqueous vehicle is removed during the drying operation. The coating composition, moreover, once dried should have sufficient hardness that the tape and coating can be spooled and handled without the coating rubbing off. In addition, the coating should hold any pigments in stable suspension throughout drying. Finally the materials in the coating composition which remain after drying, aside from the polytetrafluoroethylene and any pigments, should vaporize below the curing temperature of polytetrafluoroethylene in order to avoid any undesirable residues in the finished insulation.

While the wetting agents frequently found in commercial dispersion of uncured polytetrafluoroethylene meet the requirement that they vaporize below the curing temperature of the resin, it is usually desirable to incorporate additional amounts of such wetting agents to facilitate even spreading of the coating composition on the tape and more complete wetting of the tape surface. In addition, it is imperative that a viscosity modifier, such as polyisobutylene, be incorporated in the coating composition, preferably in the form of an aqueous dispersion. The viscosity modifier imparts a stability to the coating which tends to make it stay when it is applied as a uniformly thick film while the coating is being dried and stabilizes such ingredients as pigments which must be suspended in the coating composition. The viscosity modifier, moreover, after drying of the coating on the tape's surface has the property of imparting a sufficient hardness to the coating so that it will withstand normal handling, spooling and running through a parallel wrap operation without rubbing off. Furthermore, a viscosity modifier, such as polyisobutylene, as is well known, decomposes upon heating with chain breakdown and evolution of the gaseous hydrocarbon at temperatures substantially less than the curing temperature (621° F.) of polytetrafluoroethylene.

In accordance with this invention, conductor sizes to be covered with parallel wrapped insulation range from the smallest sizes available up to the largest diameters which can be conveniently handled. Employing a ten-inch diameter parallel wrapping drum with a 30° lead angle between tape and conductor, solid conductors cannot be employed in sizes larger than #36 AWG and stranded conductors cannot be employed in sizes larger than #8 or #10 AWG. Larger drum diameters will, of course, permit handling larger sizes of conductor. Under the same condition, tape thicknesses will generally vary between one mil and seven mils, although larger and smaller thicknesses can be accommodated. Similarly, tape width will generally range from 1/16 inch to one inch, and up to four tapes can be employed simultaneously without difficulty. When more than one tape is employed they can be overlapped or applied separately and also in combinations of two or more overlapped with others separately applied. Ultimate insulation thicknesses can be built up almost as desired but generally will range from four to 40 mils.

For a more complete understanding of the practical application of the principles of this invention, reference is made to the appended drawings, in which.

Figure 1:
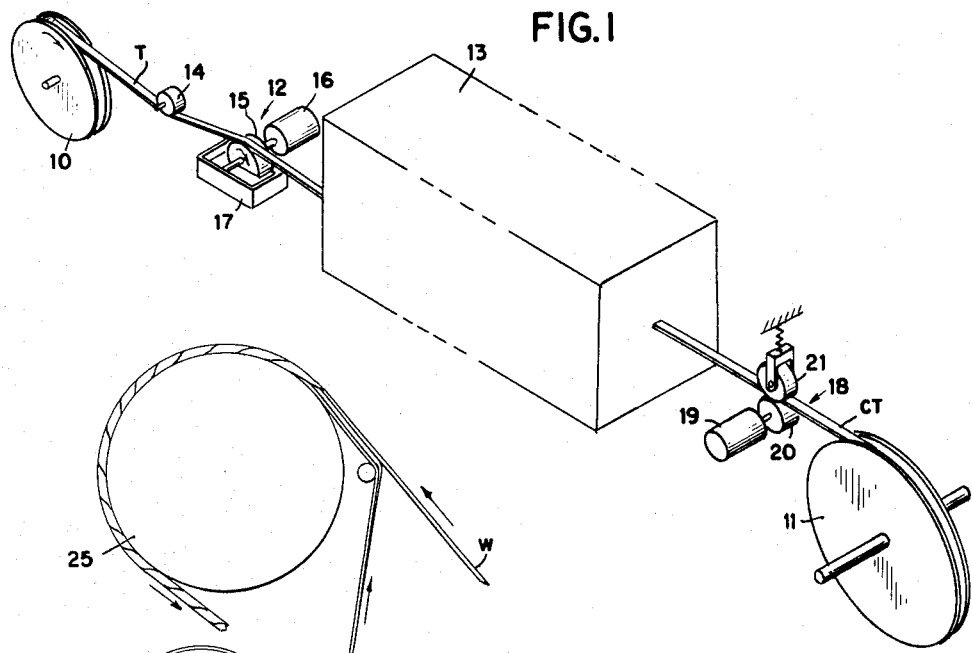
FIGURE 1 is a simplified isometric view of an apparatus suitable for coating one side of sintered polytetrafluoroethylene tape with a dispersion of uncured polytetrafluoroethylene particles.

Referring to FIGURE 1, suitable coating apparatus will include a pay-off spool 10, a take-up spool 11, an inking device 12 and oven 13. These are arranged such that skived polytetrafluoroethylene tape T passes from pay-off spool 10 beneath an idler roller 14 over the upper surface of a wheel applicator 15, which together with a driving motor 16 and ink fountain 17, forms inking device 12. Tape T with its underside coated with ink transferred from fountain 17 by wheel applicator 15 is then drawn through drying oven 13 by a capstan 18 to take-up spool 11. Capstan 18 typically includes a drive motor 19, a roll 20 driven by motor 19 and a spring-biased pressure roll 21, which bears against roll 20 to provide sufficient frictional contact between rolls 20 and 21 to draw tape T from pay-off spool 10.

Figure 3:
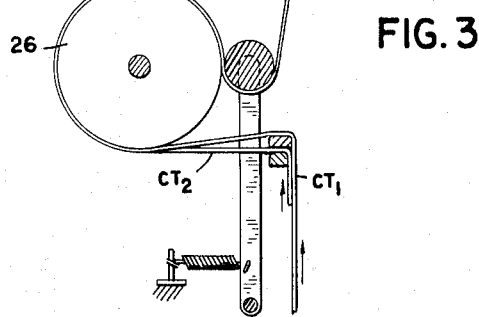
FIGURE 3 is an end view of the apparatus shown in FIGURE 2.
Figure 2:
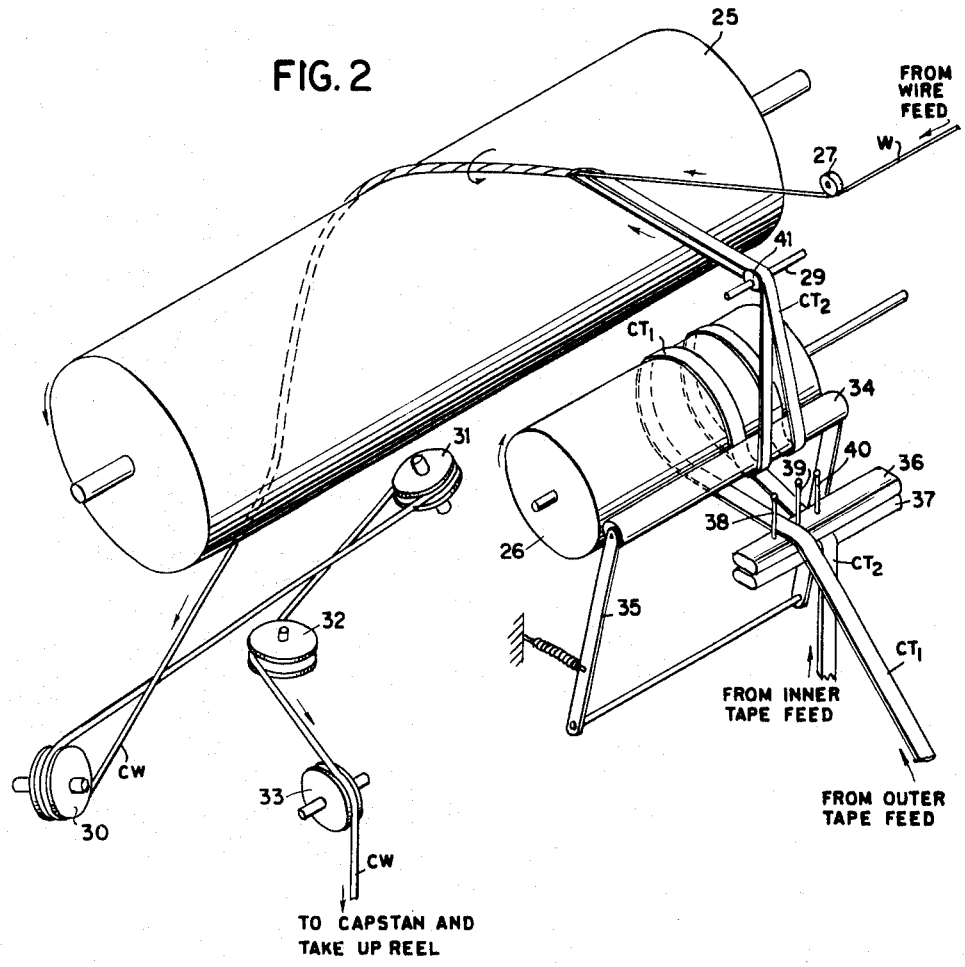
FIGURE 2 is a simplified isometric view of a parallel wrapping apparatus.

The coated tape CT drawn through oven 13 and wound up on spool 11 is transferred then to the parallel wrap apparatus shown in FIGURES 2 and 3. The parallel wrap apparatus basically includes an internally heated cylindrical drum 25, which is suitably mounted for rotation and provided with a drive motor to rotate it in a counter-clockwise direction as seen from its left end in FIGURE 2 and in FIGURE 3. The parallel wrap apparatus also includes a tape feed guide drum 26, which is driven at a certain ratio of surface speed to that of heated drum 25 in a clockwise direction as seen from the left end in FIGURES 2 and 3.

Wire W which is to be covered, is passed from a suitable supply under some tension under a guide sheave 27 mounted adjacent the right end of drum 25 as shown in FIGURE 2, to the front surface of drum 25. Wire W is then passed over the top of drum 25 to its reverse side in the same direction as drum 25 rotates. At the same time, two polytetrafluoroethylene coated tapes CT1 and CT2 are passed from suitable feed and tensioning devices around tape feed and guide drum 26 over a guide bar 29 with their coated sides facing upwardly and with tape CT1, which is to form the outer portion of the ultimate insulated covering lying beneath tape CT2, which is to form the inner tape of the covering, and with the left margin of tape CT2 overlapping the right margin of tape CT1. The overlapping tapes, with their coated sides facing upwardly, are then passed to the front surface of heated drum 25 which they contact immediately beneath wire W as it meets the surface of drum 25. Tapes CT1 and CT2 and wire W pass together over the top of drum 25 to its reverse side, moving steadily to the left end of drum 25 to a a guide sheave 30 mounted for free rotation beneath the left end of drum 25, which is directed to receive the resulting insulated wire CW as it leaves the reverse side of drum 25 and pass it to a sheave 31 mounted for free rotation behind drum 25 and to the right of sheave 30. In passing about sheave 30, an axial twist is given to wire CW reversing the twist imparted by prior rolling contact on drum 25. Insulated wire CW is then passed from sheave 31 to a pair of guide sheaves 32 and 33, which lead to a capstan and take-up reel.

As will be seen particularly in FIGURE 2, tape feed and guide drum 26 is associated with a friction roller 34 which is mounted on a hinged frame 35 and spring biased into frictional contact with the surface of drum 26. Roller 34 is freely rotatable about a horizontal axis parallel to the axis of drum 26 and normally rotates by contact with drum 26. Drum 26 is also associated with a pair of superposed, horizontal tape guide blocks 36 and 37 with which are associated vertical guide pins 38, 39 and 40.

Tape CT1 taken from a suitable spool, such as spool 11 from the coating operation, and passed over suitable tensioning devices is drawn with its coated side up over guide block 36 and between pins 38 and 39 to the underside of drum 26 and passes behind drum 26 in frictional contact with its surface to the forward surface of drum 26 and between drum 26 and roller 34, under which, in turn, it passes and is guided upwardly over guide bar 29. The left end of guide bar 29 is provided with an adjustable nut 41 to prevent movement of tape CT1 toward the left under the influence of forces placed upon it by drum 25 to which it passes from guide bar 29.

Inner tape CT2, which is similarly drawn from a spool through tensioning devices passes to the right of tape CT1 between guide blocks 36 and 37 and guide pins 39 and 40, which extend through block 36 and terminate in block 37. Tape CT2 then passes to the underside of drum 26 spaced to the right of tape CT1 and similarly passes behind drum 26, over drum 26 to its forward surface, between roller 34 and drum 26, and thence about roller 34 over guide bar 29, where it overlies tape CT1 not, however, reaching nut 41.

The overlying pair of tapes CT1 and CT2 pass from guide bar 29 tangent to the surface of drum 25 directly beneath wire W with their coated sides facing up toward wire W. The rotation of drum 25, coupled with the continuing forward movement of tapes CT1 and CT2 and wire W causes the assembly on the surface of drum 25 to rotate in a counterclockwise direction as seen along the axis of wire W as viewed from the forward side of drum 25. Such rotation causes tapes CT1 and CT2 to roll helically in overlapping layers on wire W. At the same time the heat of drum 25 raises the temperature of tapes CT1 and CT2 to the fusion point. As the assembly of tapes and wire passes around drum 25 moving progressively toward the left end of drum 25, the rolling contact of the assembly on the drum surface also applies pressure to cause the heated tapes to coalesce. As the assembly of wire and tapes is drawn from the left end of the surface of drum 25 over sheave 30, the reverse axial twist thereby imparted causes tapes CT1 and CT2 to unlay and assume a spiral wrap about wire W as an axis which has been described above as a parallel wrap.

Figure 4:
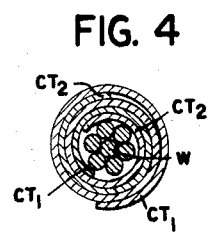
FIGURE 4 is a cross-sectional view of a conductor provided with parallel wrapped insulation in accordance with this invention.

As seen in FIGURE 4, tape CT2 is predominantly on the inside of the wrapping thus made while tape CT1 is predominantly on the outside, although both tapes will overlap of necessity because of the overlapping arrangement by which they were fed to wire W. The covered wire CW thus formed then leaves the upper side of sheave 30 to the forward side of sheave 31 spanning a considerable distance through which the hot insulation cools below its fusion point to a set condition.

Figure 5:
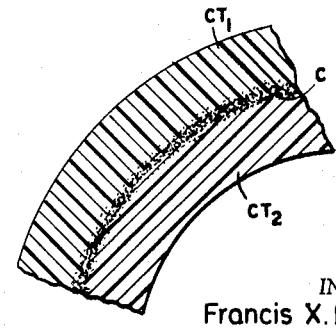
FIGURE 5 is an enlarged fragmentary view of a portion of FIGURE 4.

During the wrapping operation on drum 25, as stated above the constant rolling of the assembled wire and tapes presses the layers of tapes CT1 and CT2 together, while the heated surface of the drum provides the necessary heat not only to fuse the tapes but to sinter their polytetrafluoroethylene coating, with the result that the insulated coating on wire CW is a substantially homogeneous fused mass. Thus, as seen in the fragmentary view of FIGURE 5 showing adjacent wrappings of tapes CT1 and CT2 after the insulated wire CW has passed reverse twist sheave 30 the coating C on the inner face of tape CT1 has fused and merged into both tapes CT1 and CT2, joining these firmly and filling all voids.

It will be also observed in the wrapping operation on drum 25 that the twisting caused by the rotation of the assembly of tapes and wire will produce a left hand twist in the lay of wire W. As the insulated wire CW passes about sheave 30, a right hand twist is imparted to it, thereby straightening wire W and relieving it of any strain which might be imposed during the wrapping operation. The coated wire is then, of course, passed around guide sheaves 32 and 33 to a capstan and take-up reel.

EXAMPLES

Coating operation

An ink formulation was prepared mechanically blending the following materials and proportions:

Distilled water _____ 3 fluid ounces.
Polytetrafluoroethylene dispersion [1] ___ 3 fluid ounces.
Loxite 8502 [2] _____ 1 fluid ounce.
Wetting agent, Triton X-100 [3] _____ ½ teaspoon.
Pigment, red, Ferro-5893 _____ 52 grams.

[1] An aqueous dispersion of uncured polytetrafluoroethylene colloidal particles having a diameter of 0.05–0.5 micron and amounting to 59–61% by weight of the dispersion. The dispersion also includes 5.5–6.5% by weight of Triton X-100 as a dispersant.
[2] Loxite 8502 is a proprietary product including 50% by weight of polyisobutylene in aqueous dispersion.
[3] Triton X-100 is a proprietary product having wetting and dispersing properties and is a non-ionic surfactant of the polyethoxy type.

A second ink composition was prepared identically to that above omitting the pigment and reducing the quantity of distilled water to 2½ fluid ounces.

A polytetrafluoroethylene (fully sintered) skived tape T, having ½ inch width and 0.0025 inch thickness was then drawn through the coating apparatus, applying the first above noted ink formulation to the undersurface of the tape by means of wheel applicator 15. Wheel 15 was grooved, plastic material with its under side dipped into the ink in fountain 17. Wheel 15 was driven in a direction such that its upper side contacted tape T in the same direction of movement as tape T. The diameter of the inking wheel was 2 inches; the surface speed of the wheel was 41 feet per minute; the linear speed of the tape was 21 feet per minute, 180 grams tape tension was employed; and the resultant coating thickness was 0.0009 inch. (The coating thickness can usually be varied from about 0.0002 inch to about 0.0018 inch.)

The tape with the ink coating on its under surface then was passed through drying oven 13 which was 6 feet in length and was heated between 300° F., and 450° F., a temperature substantially below that which would cause sintering of the uncured polytetrafluoroethylene coating but sufficient to dry the coating. A second tape having the same dimensions was also coated using the same operating conditions but employing the second, unpigmented ink formulation above.

Alternatively the inks could have been applied to the tapes using spray devices or the like, followed by drying.

Parallel wrapping operation

Wire W in this example was #22 AWG, 7/30, having a 0.33 inch left hand lay. The drum 25 diameter was 10 inches and drum 25 was heated to 730° F. at its center, giving a surface temperature of 650° F. where the surface contacted the tapes CT1 and CT2. The surface speed of rotation of drum 25 was 40 feet per minute. The tapes CT1 and CT2 employed were those previously coated as described above with reference to the coating operation, the inner tape CT2 being that prepared with the second ink formulation and the outer tape CT1 being that prepared with the first. Eleven pounds tension was placed on wire W while 210 to 255 grams tension was placed on each of the tapes.

The ratios of surface speeds of drum 25, the tape capstan (drum 26) and the wire capstan (controlling wire feed rate) were as follows:

| | | |
|---|---|---|
| Drum | 2.2 | 2.35 |
| Tape Capstan | 1 | 1 |
| Wire Capstan | 1.31 | 1.31 |

A 30° angle was provided between the tapes and wire at the point where these met on the surface of drum 25, with the wire approaching drum surface (from beyond its right end as seen in FIGURE 2) at a 40° angle from vertical.

The resultant insulated wire CW prepared had an insulation thickness of 0.012 inch ± 0.002 inch and had an opaque red appearance.

As suggested above, polytetrafluoroethylene insulation applied by the parallel wrapping operation without the coating or uncured polytetrafluoroethylene particles has a tendency to relieve internal stresses and withdraw longitudinally from a cut end of the wire when kept at elevated temperatures for an extended period of time, which tendency is substantially reduced when the insulated wire is produced by the process of this invention. End withdrawal was tested by placing eighteen inch samples in an oven for 96 hours at 250° C. End withdrawal of each sample was thereafter measured at both ends of the sample in 64ths of an inch. In the case of the parallel wrapped polytetrafluoroethylene insulated wire omitting the uncured polytetrafluoroethylene particle coating and before subsequent processing to reduce insulation withdrawal, based on a great number of tests the average withdrawal was $3/32$ of an inch at each end with approximately 30% of the results exceeding $1/8$ of an inch. In the case of parallel wrapped wire of this invention employing the uncured polytetrafluoroethylene particle coating, the average of about three hundred tests was a withdrawal of $1/32$ inch with less than 2% of the results showing a withdrawal of $1/8$ inch or greater.

Samples of extruded polytetrafluoroethylene insulated wire, parallel wrapped polytetrafluoroethylene insulated wire using uncoated tapes and parallel wrapped polytetrafluoroethylene insulated wire using coated tapes according to this invention were immersed in water with a 5% solution of a wetting agent for a period of four hours, after which the samples were subjected to insulation breakdown using a high potential test set. The voltage was increased at a rate of 500 volts per second until each sample failed. The results of these tests were as follows:

| Type of Wire | Range of Insulation Thickness, inches | Dielectric Strength, volts per mil |
|---|---|---|
| Extruded | 0.007-0.020 | 580 |
| Parallel Wrapped | ¹ 0.005-0.020 | 750 |
| Coated Parallel Wrapped | ¹ 0.005-0.020 | 810 |

¹ In the range of 0.005 inch-0.007 inch wall thickness, the dielectric strength increased approximately 10%

Also as suggested above, the uniform distribution of the polytetrafluoroethylene dispersion on the skived tape is not obtained, absent a viscosity modifier such as polyisobutylene. Thus, for example, ½ inch by 0.0025 inch skived polytetrafluoroethylene tape was coated in accordance with this invention with the ink formulation described above in which the pigment is omitted. Other tape of the same dimensions was coated with an aqueous colloidal dispersion of polytetrafluoroethylene, having the same particle size and dispersant as the dispersion described above, which was diluted to 50% by weight of the polymer and which contained in addition 4% based on the weight of polymer of sodium dodecyl sulfate but no polyisobutylene. Yet further tape was coated with an otherwise identical composition (no polyisobutylene) containing 5-6% by weight on the polymer of cadmium sulfide pigment.

All the tapes were dried as described above. It was noted that both ink formulations in which the viscosity modifier (polyisobutylene) was omitted did not coat the skived tape uniformly and during drying tended to form puddles.

As described above the tapes were then applied to AWG 22, 7/30, concentric silver plated copper conductor. In each case two tapes were applied about the conductor, coated side in. In one case, both such tapes were those coated with the unpigmented ink formulation described above in accordance with this invention; in the second case both tapes were coated with unpigmented ink formulation in which the viscosity modifier was omitted; and in the third case the inner tape was coated with the unpigmented ink in which the viscosity modifier was omitted and the outer tape was coated with the pigmented ink omitting the viscosity modifier.

The finished wire in each case (five samples of the wire made in accordance with this invention and four samples each of the other two wires) were tested for dielectric strength by flexing for 500 cycles through a 90° arc, 45° each side of vertical, in which each sample had a four pound weight attached to its lower end and was flexed between two pins $3/16$ inch in diameter. After flexing the samples were immersed in tap water and voltage applied across the insulation increased until there was a dielectric failure. All five samples made employing the tape coated with the unpigmented ink formulation in accordance with this invention (containing both the polytetrafluoroethylene dispersion and polyisobutylene dispersion) did not fail up to 10,000 volts, the maximum limit of the test set. Each of the four samples having the coating made with the unpigmented ink having no viscosity modifier failed between 6,000 and 8,000 volts and each of the four samples made with the tapes coated with the pigmented ink composition in which the viscosity modifier was omitted failed between 6,600 and 9,200 volts.

The appearance of the wire made in accordance with this invention was clean; the diameter of the insulation was uniform; and the surface of the insulation had the characteristic smooth, slippery feeling of polytetrafluoroethylene resin. The wires made with the tapes coated with the ink formulations omitting the viscosity modifier generally had non-uniform diameter, were rough to touch and, where the pigment was omitted, tended to be splotchy and gray in color rather than the off-white characteristic color of the wires made in accordance with this invention.

Generally speaking the preferred polyisobutylenes are relatively low molecular weight, rubbery solids having molecular weights on the order of 10,000. Best results are obtained when the proportion of polyisobutylene solids is at least 10% at not more than 30 or 35% by weight of the polytetrafluoroethylene solids.

While it has been demonstrated above that polytetrafluoroethylene insulated conductors having novel properties can be prepared in accordance with this invention, it will be apparent also that the process of this invention provides a wire which can have colored polytetrafluoroethylene insulation which cannot be removed by scuffing and abrasion and which will not substantially affect the dielectric strength of the insulation. In addition colored stripes running both longitudinally and spirally can be applied further to aid in color coding of the resultant insulated wire.

Thus a longitudinal stripe can be introduced by coating the skived tape first with a narrow longitudinal stripe using a pigmented uncured polytetrafluoroethylene coating composition over which a second, unpigmented or differently pigmented, coating composition is then applied to cover the entire face of the tape. The stripe should be located near the edge of the tape which will form the outer layer of the parallel wrapping in order to make the stripe more fully visible, particularly where the tape is subsequently coated with a pigmented composition. Spiral color striping can be similarly achieved by marking the skived tape with diagonal lines of pigmented coating composition spaced with regard to the angle of their marking and the ultimate diameter of the final insulated wire such that as the tape is spirally wrapped about the wire in the parallel wrapping operation, the diagonal lines showing through on the surface of the insulated wire will run together in a helical fashion lengthwise of the insulated wire.

We claim:

1. A process for covering an elongated body with a polytetrafluoroethylene resinous covering which includes coating one side of a tape of sintered polytetrafluoroethylene resin with an aqueous dispersion of finely divided, uncured polytetrafluoroethylene resin and of polyisobutylene as a volatile viscosity modifier, drying said coating, parallel wrapping said coated tape in a generally spirally overlapping relation over said elongated body with said coated side of said tape facing said body, heating said tape and apply pressure thereto while wrapping said tape over said elongated body to cause said polytetrafluoroethylene in said tape and coating to fuse together in said spiral relationship over said elongated body, and thereafter cooling said tape to set said tape in said spiral relationship about said elongated body.

2. A process for covering an elongated body with a polytetrafluoroethylene resinous covering which includes coating one side of a tape of sintered polytetrafluoroethylene resin with an aqueous dispersion of finely divided, uncured polytetrafluoroethylene resin and of polyisobutylene, drying the coated tape to remove volatiles from said coating, parallel wrapping said coated tape in a generally spirally overlapping relation over said elongated body with said coated side of said tape facing said body by helically winding said tape in overlapping relationship with said coated side facing inwardly about said elongated body while rolling said elongated body and winding in the direction of the helical winding, heating said tape and applying pressure thereto while winding said tape over said elongated body to cause said polytetrafluoroethylene in said tape and coating to fuse together, therafter giving said tape and coating an axial twist to realign said tapes in said spiral relationship over said elongated body, and thereafter cooling said tape to set said tape in said spiral relationship about said elongated body.

3. The process of claim 2 in which said composition also includes a pigment.

References Cited by the Examiner

UNITED STATES PATENTS

| | | | |
|---|---|---|---|
| 2,335,191 | 11/1943 | Minich | 156—51 |
| 2,484,484 | 10/1949 | Berry | 174—110.6 |
| 2,578,522 | 12/1951 | Edgar. | |
| 2,765,241 | 10/1956 | Wayne | 117—138.8 |
| 2,888,042 | 5/1959 | St. John et. al. | |

OTHER REFERENCES

Du Pont: Teflon, Tetrafluoroethylene Resins, Properties, Uses, 32 pages, copyright 1957, E. I. du Pont de Nemours and Co. Inc.

EARL M. BERGERT, *Primary Examiner.*

P. R. WYLIE, J. MATHEWS, *Examiners.*

UNITED STATES PATENT OFFICE
CERTIFICATE OF CORRECTION

Patent No. 3,223,564                      December 14, 1965

Francis X. Buschman et al.

It is hereby certified that error appears in the above numbered patent requiring correction and that the said Letters Patent should read as corrected below.

Column 2, line 1, before "heated" insert -- a --; column 4, line 53, strike out "a"; column 7, line 5, for "or" read -- of --; column 10, line 12, after "UNITED STATES PATENTS" insert -- Re. 24,856    8/1960    Panagrossi et al. --.

Signed and sealed this 24th day of May 1966.

(SEAL)
Attest:

ERNEST W. SWIDER                      EDWARD J. BRENNER
Attesting Officer                      Commissioner of Patents